UNITED STATES PATENT OFFICE.

GUSTAVE O. ZELLER, OF RAHWAY, NEW JERSEY.

PROCESS OF MANUFACTURING PYROXYLIN SOLVENTS AND THEIR PRODUCTS.

SPECIFICATION forming part of Letters Patent No. 518,386, dated April 17, 1894.

Application filed December 12, 1893. Serial No. 493,615. (No specimens.)

*To all whom it may concern:*

Be it known that I, GUSTAVE O. ZELLER, a citizen of the United States, residing at Rahway, county of Union, State of New Jersey, have invented certain new and useful Improvements in Processes of Manufacturing Pyroxylin Solvents and their Products; and I do hereby declare the following to be a full, clear, and exact description of the invention, which will enable others skilled in the art to which it appertains to use the same.

The object of my invention is to prepare thick and thin solutions of pyroxyline, by dissolving soluble pyroxyline in a solvent obtained by preparing derivatives of aldehydes by substituting for the hydrogen of the COH group, radicles of organic acids either of the fatty acid series or of the aromatic series, which derivatives have not yet received specific chemical terms. These derivative compounds are obtained by subjecting an alcohol to the action of an oxidizing agent in the presence of a compounding organic acid, whereby the aldehyde in nascent condition unites with the acid radicle, in substitution for the H of the COH group of the aldehyde. As by the action of oxidizing agents on alcohols not only aldehydes are formed but also acids, the aforesaid reaction will take place, when an alcohol alone is subjected to the action of an oxidizing agent and the aldehyde and the acid formed react upon each other in a nascent condition.

As an example of such a preparation in actual manufacture I give the following formula, but I do not limit myself to these proportions nor to the ingredient alcohol and acids: amylic alcohol, four parts, by weight; pyroligneous acid, two parts; and these to be treated with a mixture of sulphuric acid, two parts, and peroxide of manganese, one part.

The aforesaid compounds are solvents of pyroxyline as well as of the gum-resins employed in the art of making pyroxiline compounds such as shellac, rosin, kauri, &c.; and are diluents of other solvents and of the solutions of other solvents and of their own solutions of pyroxyline.

What I claim as my invention, and desire to secure by Letters Patent, is—

1. The herein described process of preparing solvents of pyroxyline which consists in subjecting aldehydes to the action of organic acids and simultaneously to the action of an oxidizing agent, substantially as described.

2. The herein described process of preparing solvents of pyroxyline which consists in subjecting aldehydes to the action of organic acids and an oxidizing agent, either the aldehyde or the acid being in nascent condition.

3. A compound of pyroxyline which consists of pyroxyline dissolved in primary alcohols which by themselves are not solvents of pyroxyline but are rendered so by being oxidized in the presence of a compounding organic acid.

GUSTAVE O. ZELLER.

Witnesses:
R. DOLMETSCH,
C. L. BORGMEYER.